US012715051B2

(12) United States Patent
Tanaami et al.

(10) Patent No.: US 12,715,051 B2
(45) Date of Patent: Aug. 25, 2026

(54) DRILLING DEVICE

(71) Applicant: SINTOKOGIO, LTD., Nagoya (JP)

(72) Inventors: Yoshikane Tanaami, Nagoya (JP); Miyuki Hayashi, Nagoya (JP); Takahiro Kokawaji, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 690 days.

(21) Appl. No.: 18/166,048

(22) Filed: Feb. 8, 2023

(65) Prior Publication Data

US 2023/0278112 A1 Sep. 7, 2023

(30) Foreign Application Priority Data

Mar. 4, 2022 (JP) ................................ 2022-033832

(51) Int. Cl.
*B23B 47/32* (2006.01)
*B23Q 17/00* (2006.01)

(52) U.S. Cl.
CPC ........ *B23B 47/32* (2013.01); *B23B 2270/483* (2013.01); *B23Q 2017/001* (2013.01)

(58) Field of Classification Search
CPC .............. B23B 47/32; B23B 2270/483; B23Q 17/2275; B23Q 2017/001
See application file for complete search history.

(56) References Cited

U.S. PATENT DOCUMENTS 4,608,875 A 9/1986 Wallace
5,401,128 A * 3/1995 Lindem ................ B23Q 1/5462 408/1 R
5,575,597 A * 11/1996 Bailey ....................... B23C 1/12 901/29
5,715,729 A * 2/1998 Toyama ............... B23Q 1/5462 901/29
6,059,703 A * 5/2000 Heisel .................. B25J 17/0266 409/145
6,497,548 B1 * 12/2002 Roy ..................... B23Q 1/5462 901/29
6,719,506 B2 * 4/2004 Chang .................... B25J 9/0042 409/137

(Continued)

FOREIGN PATENT DOCUMENTS

CN 103639477 A 3/2014
DE 10146042 A1 * 5/2003 ......... A61B 17/1659

(Continued)

OTHER PUBLICATIONS

Japanese Office Action and English translation for Japanese Application No. 2022-033832 mailed Aug. 5, 2025.

*Primary Examiner* — Eric A. Gates
(74) *Attorney, Agent, or Firm* — Harness, Dickey & Pierce, P.L.C.

(57) ABSTRACT

A reduction of a bend of a drill during processing is achieved. A drilling device includes: a spindle for rotating a drill so that the drill processes an object; a parallel link mechanism configured to adjust a direction of the spindle; a force sensor configured to detect a moment from the object and about an axis perpendicular to an axial direction of the spindle while the object is processed; and a control section configured to control the parallel link mechanism on the basis of the moment detected by the force sensor so that the parallel link mechanism adjusts a direction of the spindle.

8 Claims, 5 Drawing Sheets

(56) References Cited

U.S. PATENT DOCUMENTS 6,840,127 B2 * 1/2005 Moran ..................... G09B 9/46 414/735
6,943,519 B2 * 9/2005 Puchtler ................. B25J 9/1623 318/566
7,104,746 B2 * 9/2006 Schwaar .............. B25J 17/0266 74/490.06
7,148,646 B2 * 12/2006 Matsushita ............ B25J 9/1623 318/560
7,706,922 B2 * 4/2010 Ueno ..................... B25J 9/1623 318/632
7,905,765 B2 * 3/2011 Ota ...................... B23Q 1/5462 451/8
7,938,602 B2 * 5/2011 Ota ........................ B25J 9/1623 409/235
8,783,127 B2 * 7/2014 Neumann ............ B25J 17/0266 901/14
2003/0005786 A1 * 1/2003 Stuart .................. B25J 17/0266 409/235
2004/0126198 A1 7/2004 Chen
2010/0254778 A1 * 10/2010 Whinnem ............ B23Q 1/5462 408/72 R
2011/0255930 A1 10/2011 Eriksson et al.
2019/0193167 A1 6/2019 Horiuchi et al.
2019/0299350 A1 10/2019 Sakai
2021/0039175 A1 2/2021 Shamoto et al.

FOREIGN PATENT DOCUMENTS

JP 04-348802 12/1992
JP H07-080756 A 3/1995
JP 2000-334687 A 12/2000
JP 2003-245812 A 9/2003
JP 2019-136789 A 8/2019
JP 2019-171503 A 10/2019
WO 03/008137 A2 1/2003

* cited by examiner

DRILLING DEVICE

This Nonprovisional application claims priority under 35 U.S.C. § 119 on Patent Application No. 2022-033832 filed in Japan on Mar. 4, 2022, the entire contents of which are hereby incorporated by reference.

TECHNICAL FIELD

The present invention relates to a drilling device.

BACKGROUND ART

A drilling device is known which forms, with use of a drill, a hole in an object to be processed (for example, Patent Literature 1). When the drill is pressed against the object to be processed, the drill may wobble. This may cause the drill to bend. Such a bend of the drill may cause a bend of a drilled hole and may further cause damage to the drill. One possible measure for addressing such a problem is to use a high-strength drill which is less likely to bend and break.

CITATION LIST

Patent Literature

[Patent Literature 1]

Japanese Patent Application Publication Tokukai No. 2019-136789

SUMMARY OF INVENTION

Technical Problem

Unfortunately, there is a certain limit on enhancement of strength of the drill itself. In addition, it is preferable to reduce a breakage and a bend of a common drill which does not achieve enhancement of strength.

It is an object of an embodiment of the present invention to provide a drilling device that achieves a reduction of a bend of a drill during processing.

Solution to Problem

In order to solve the foregoing problem, a drilling device in accordance with an embodiment of the present invention includes a spindle, a parallel link mechanism, a force sensor, and a control section. The spindle rotates a drill so that the drill processes an object. The parallel link mechanism adjusts a direction of the spindle. The force sensor detects a moment from the object and about an axis perpendicular to an axial direction of the spindle while the object is processed. The control section controls the parallel link mechanism on the basis of the moment detected by the force sensor and causes the parallel link mechanism to adjust the direction of the spindle.

Advantageous Effects of Invention

According to an aspect of the present invention, it is possible to provide a drilling device that achieves a reduction of a bend of a drill during processing.

BRIEF DESCRIPTION OF DRAWINGS

FIG. 3 is a flowchart showing an example of an operation procedure of the drilling device.

FIG. 5 is a view illustrating a drilling device in accordance with a variation of the present invention.

DESCRIPTION OF EMBODIMENTS

Embodiment

Figure 1:
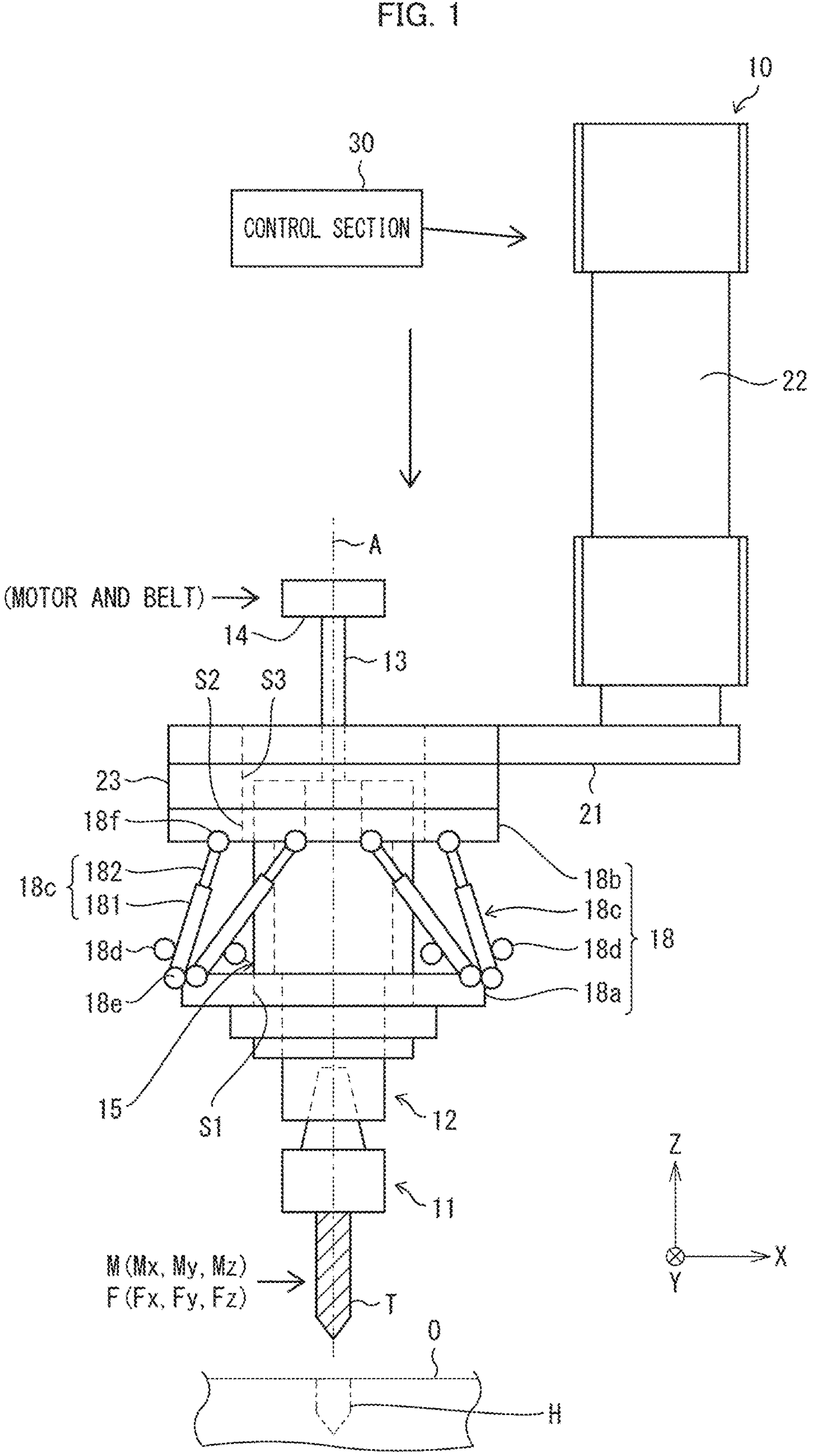
FIG. 1 is a view illustrating a drilling device in accordance with an embodiment of the present invention.

The following will describe an embodiment of the present invention in detail. FIG. 1 is a view illustrating a drilling device 10 in accordance with an embodiment of the present invention. XYZ coordinates are set such that the Z axis is the vertical direction, and the X axis and the Y axis are directions which are orthogonal to each other on a plane perpendicular to the vertical direction. The following will describe the drilling device 10 with reference to FIG. 1.

The drilling device 10 includes a chuck 11, a spindle 12, a shaft 13, a pulley 14, a spindle holding section 15, a parallel link mechanism 18, an attachment stay 21, a servo cylinder 22, a force sensor 23, and a control section 30.

The chuck 11 chucks a drill T to hold the drill T. The spindle 12 is connected to the chuck 11 and is rotated by a motor and a belt via a shaft 13 and a pulley 14. As a result, the drill T is rotated to cut an object (object to be processed) O, so that a hole H is formed in the object O. That is, the spindle 12 rotates the drill T so that the drill T processes the object O.

The spindle holding section (holding section) 15 holds the spindle 12 such that the spindle 12 is rotatable. This will be described in detail later.

The parallel link mechanism 18 is connected to the attachment stay 21 via the force sensor 23. The parallel link mechanism 18 holds the spindle holding section 15 such that a tilt of the spindle holding section 15 is adjustable with respect to the attachment stay 21. That is, the parallel link mechanism 18 adjusts, via the spindle holding section 15, a direction of the spindle 12, to be specific, an angle of the spindle 12 (to be specific, an angle of the drill T) with respect to the object O. Note that FIG. 1 illustrates a state in which a direction along an axis A (hereinafter, also referred to as “axial direction”) of the spindle 12 is aligned with the Z axis.

The attachment stay 21 is connected to the force sensor 23 and the parallel link mechanism 18 and is moved upward and downward by the servo cylinder 22. The servo cylinder 22 has a cylinder mechanism and moves the attachment stay 21 upward and downward. As a result, the servo cylinder 22 adjusts a distance of the spindle 12 (to be specific, the drill T) from the object O via the attachment stay 21, the force sensor 23, the parallel link mechanism 18, and the spindle holding section 15. That is, the servo cylinder 22 serves as a distance adjustment mechanism for adjusting the distance between the spindle 12 and the object O.

Figure 2:
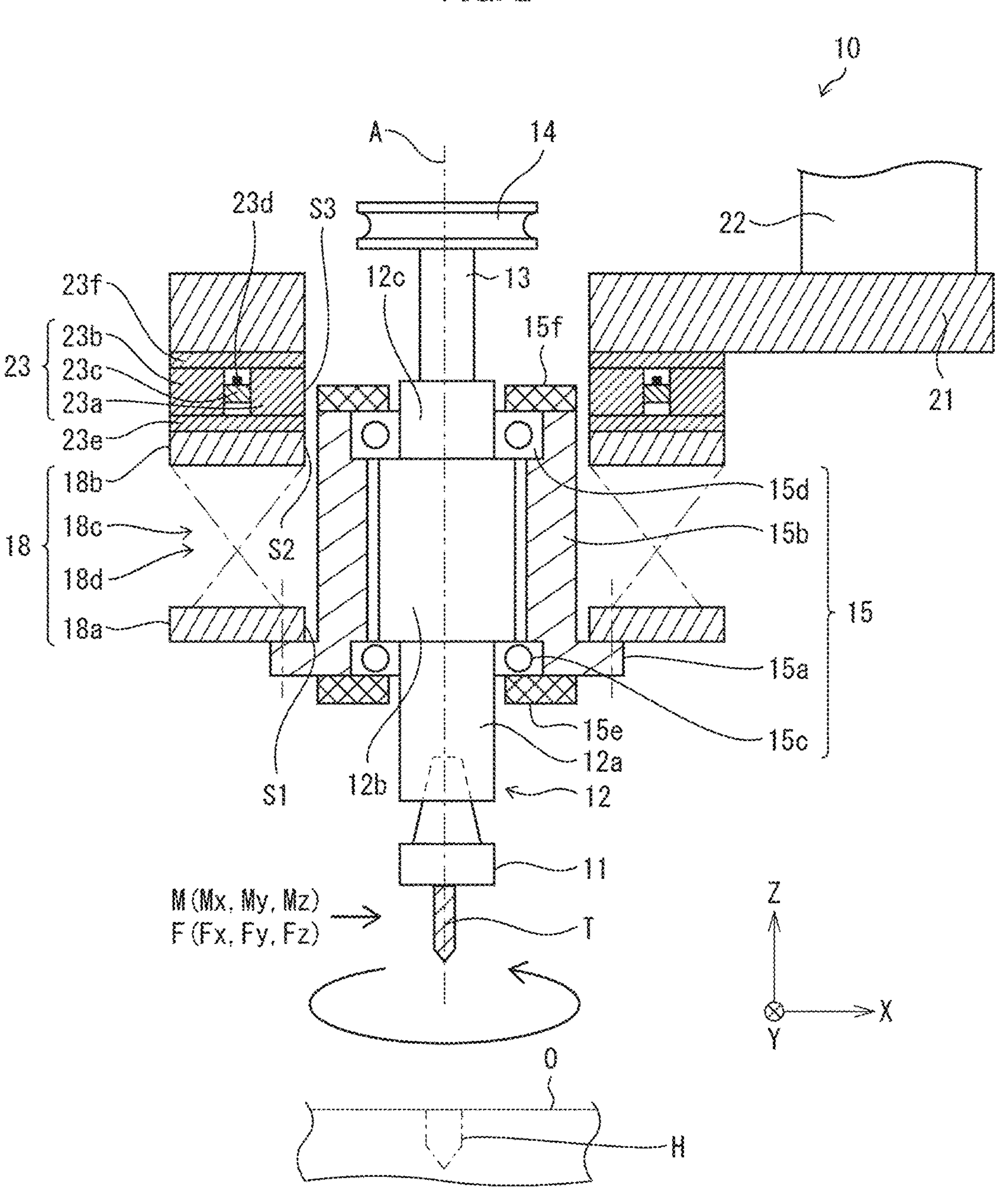
FIG. 2 is a cross-sectional view illustrating a cross-section of a part of a drilling device in accordance with an embodiment of the present invention.

FIG. 2 is a cross-sectional view illustrating a cross-section of a part of the drilling device 10. The following will describe the drilling device 10 in detail with reference to FIG. 2. Note that, for ease of understanding, the details of the parallel link mechanism 18 are not depicted in FIG. 2.

As illustrated in FIG. 2, the spindle 12 includes members **12*a* to 12*c*. The members 12*a* to 12*c*** have coaxial and substantially cylindrical shapes, and are integrally formed.

The member 12*b* has a diameter larger than diameters of the members 12*a* and 12*c* and is held in the spindle holding section 15.

The spindle holding section 15 has a bottom member 15*a*, a cylindrical member 15*b*, friction-reducing mechanisms 15*c* and 15*d*, and holding parts 15*e* and 15*f*. The bottom member 15*a* is connected to the parallel link mechanism 18, which adjusts the tilt of the bottom member 15*a*. The cylindrical member 15*b* has an inner circumference corresponding to an outer circumference of the member 12*b* of the spindle 12 and accommodates the member 12*b*. The friction-reducing mechanisms 15*c* and 15*d* are, for example, bearing mechanisms, and hold the spindle 12 (member 12*b*) in the cylindrical member 15*b* from above and below such that the spindle 12 (member 12*b*) is rotatable. The holding parts 15*e* and 15*f* are fixing members for holding the friction-reducing mechanisms 15*c* and 15*d* in the cylindrical member 15*b*.

The following will further describe the drilling device 10 with reference to FIG. 1. The parallel link mechanism 18 has stages 18*a* and 18*b*, a plurality of links 18*c*, a plurality of driving parts 18*d*, and a plurality of connecting members 18*e* and 18*f* and adjusts an orientation of the stage 18*a* with respect to the stage 18*b*.

The stage 18*a* serves as a first stage fixed to the spindle holding section 15, and the stage 18*b* serves as a second stage opposite to the stage 18*a*. The stages 18*a* and 18*b* have substantially ring shapes and respectively have openings S1 and S2 in which the spindle 12 and the spindle holding section 15 are disposed. The openings S1 and S2 respectively serve as first and second insertion portions through which the spindle 12 is inserted.

The plurality of (for example, six) links 18*c* are arranged next to each other, and connect the stage 18*a* and the stage 18*b* via the connecting members 18*e* and 18*f*. The plurality of links 18*c* are disposed around the outer circumferences of the spindle 12 and the spindle holding section 15. This allows the parallel link mechanism 18 to operate without disturbing the rotation of the spindle 12.

The plurality of links 18*c* each have a cylindrical member 181 and bar member 182 which are slidable against each other, and each have an adjustable length. The orientation of the stage 18*a* with respect to the stage 18*b* can be adjusted by adjusting the respective lengths of the plurality of links 18*c*. The plurality of links 18*c* connect the stage 18*a* (first stage) and the stage 18*b* (second stage) in such a manner as to each have a degree of freedom (that is, variability in length). The driving part 18*d* drives the links 18*c* to change the respective lengths of the links 18*c*. This makes it possible to adjust the angle between the stages 18*a* and 18*b* with use of the plurality of links 18*c*.

The following will further describe the drilling device 10 with reference to FIG. 2. The force sensor 23 includes a core part 23*a*, a frame part 23*b*, a plurality of beam parts 23*c*, a plurality of distortion detecting elements 23*d*, and covers 23*e* and 23*f*. The core part 23*a*, the frame part 23*b*, and the beam parts 23*c*, in their entirety, serve as a strain element which is distorted by a stress.

The core part 23*a* and the frame part 23*b* have substantially ring shapes and have an opening S3 (inner circumference) in which the spindle 12 and the spindle holding section 15 are disposed. The opening S3 serves as an insertion portion through which the spindle 12 is inserted. This prevents the force sensor 23 from disturbing the rotation of the spindle 12. The core part 23*a* is connected to the stage 18*b* of the parallel link mechanism 18 via the cover 23*e*. The frame part 23*b* is connected to the attachment stay 21 via the cover 23*f*. Although not illustrated, a gap is provided between the core part 23*a* and the cover 23*f* in order to prevent a force from the attachment stay 21 from being applied to the core part 23*a*. Similarly, a gap is provided between the frame part 23*b* and the cover 23*e* in order to prevent a force from the parallel link mechanism 18 (stage 18*b*) from being applied to the frame part 23*b*. The plurality of (for example, four) beam parts 23*c* are bar-shaped members each of which connects the core part 23*a* and the frame part 23*b* in a direction (diametral direction) perpendicular to the axis A of the spindle 12 and deform in accordance with a relative displacement between the core part 23*a* and the frame part 23*b*. The plurality of distortion detecting elements 23*d* are each disposed on the corresponding one of the plurality of beam parts 23*c* and detect the respective distortions of the plurality of beam parts 23*c*.

The force sensor 23 detects, via the parallel link mechanism 18 and the spindle holding section 15, moments M (Mx, My, and Mz) and forces F (Fx, Fy, and Fz) which are applied to the spindle 12 (applied from the object O to the drill T while the object O is processed). The moments Mx, My, and Mz are the moments about the X axis, the Y axis, and the Z axis, respectively. The forces Fx, Fy, and Fz are the forces in the directions of the X axis, the Y axis, and the Z axis, respectively. Here, the moments Mx and My each refer to the moment about the axis perpendicular to the direction along the axis A of the spindle 12. The moment Mz refers to the moment about the axis A of the spindle 12. The force Fz refers to the force in an axial direction of the spindle 12.

The control section 30 carries out controls as described below in accordance with the moments M and the forces F detected by the force sensor 23.

The control section 30 controls the parallel link mechanism 18 on the basis of the moments Mx and My to cause the parallel link mechanism 18 to adjust the direction of the spindle 12. This achieves a reduction of a bend of the drill T during the processing. Specifically, in a case where the moment Mx or My is equal to or greater than a threshold Th1, the control section 30 controls the parallel link mechanism 18 so that the moment Mx or My is reduced (to be smaller than the threshold Th1). This makes it possible to reduce the moment on the basis of the threshold.

The control section 30 controls the servo cylinder 22 on the basis of the forces Fz so that the servo cylinder 22 adjusts the distance between the spindle 12 and the object O. This achieves the prevention of damage to the drill T resulting from jammed chips and the like. Specifically, in a case where the force Fz is equal to or greater than a threshold Th2, the control section 30 controls the servo cylinder 22 so that the force Fz is reduced (to less than the threshold Th2). This makes it possible to reduce the force on the basis of the threshold Th2.

The control section 30 controls the servo cylinder 22 on the basis of the moment Mz so that the servo cylinder 22 adjusts the distance between the spindle 12 and the object O. This achieves the prevention of the drill resulting from jammed chips and the like. Specifically, in a case where the moment Mz is equal to or greater than the threshold Th3, the control section 30 controls the servo cylinder 22 so that the moment Mz is reduced (to less than the threshold Th3). This makes it possible to reduce the moment about the axis of the spindle 12 on the basis of the threshold Th3.

Figure 3:
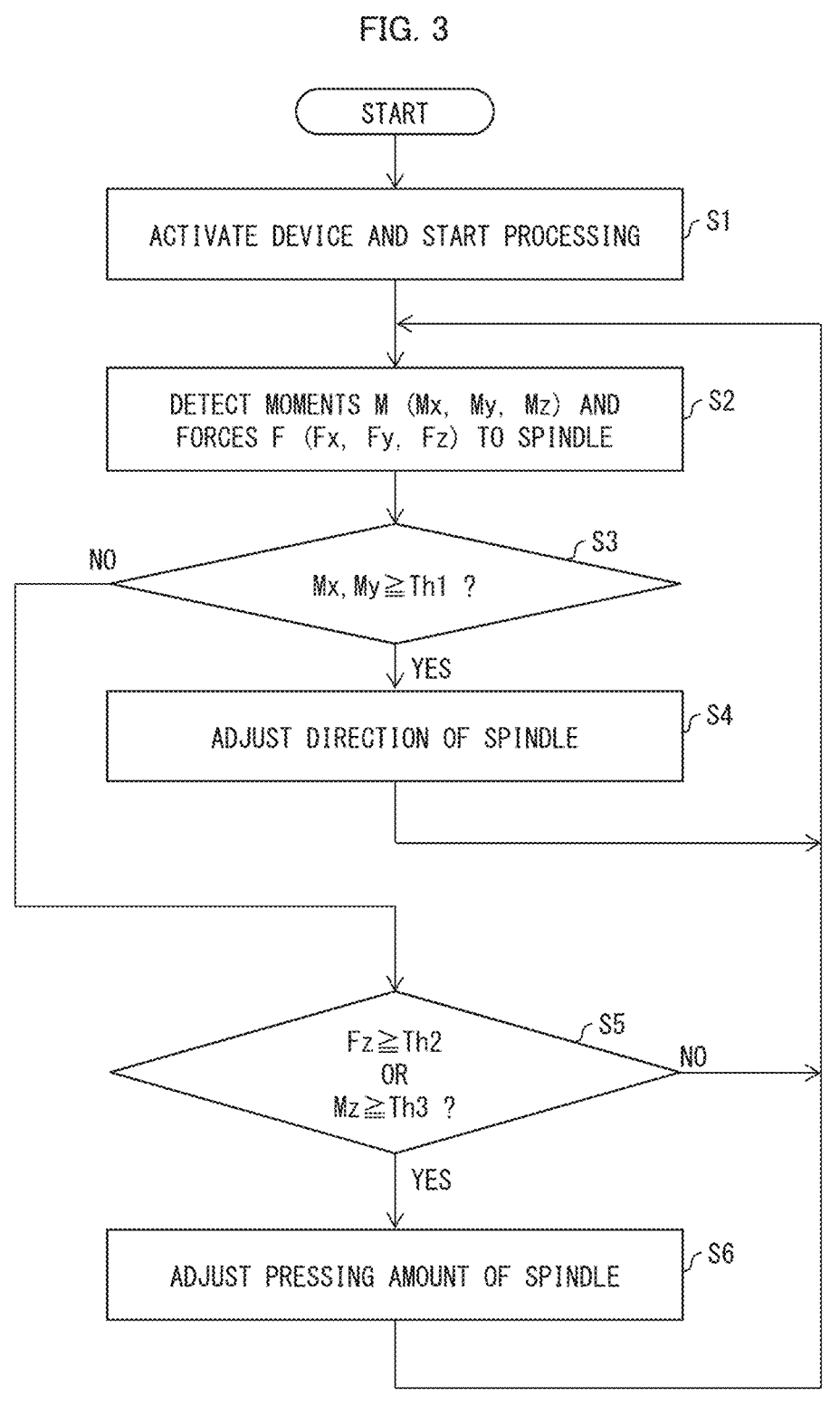

The following will describe an operation of the drilling device 10. FIG. 3 is a flowchart showing an example of an operation procedure of the drilling device 10.

The drilling device 10 is activated, and a process is started (step S1). That is, the drilling device 10 holds and rotates the drill T to form the hole H in the object O. At this time, the moments M and the forces F are applied from the object O to the drill T.

The moments Mx and My may be generated, for example, when the drill T fails to intersect with the object O perfectly at a right angle, and when the object O has some sort of unevenness (for example, unevenness in quality or surface shape of the object O).

The force sensor 23 detects the moments M and forces F applied to the spindle 12 (step S2). Specifically, the force sensor 23 detects the moments M (Mx, My, and Mz) and forces F (Fx, Fy, and Fz) applied from the object O to the drill T.

Among these, the moments Mx and My may cause a bend of the drill T, and further, may cause a bend of the hole H and damage to the drill T. In particular, (i) when the hole H needs to be deep, and (ii) when the hole H needs to have a small diameter, the moments Mx and My are likely to present a problem. For the deep hole H, the drill T to be used needs to be long, resulting in a great bend of the drill T due to the moments Mx and My. For the hole H having a small diameter, the drill T to be used needs to be thin (for example, φ0.2 mm and φ0.01 mm), resulting in a great bend of the drill T due to the moments Mx and My.

Figure 4:
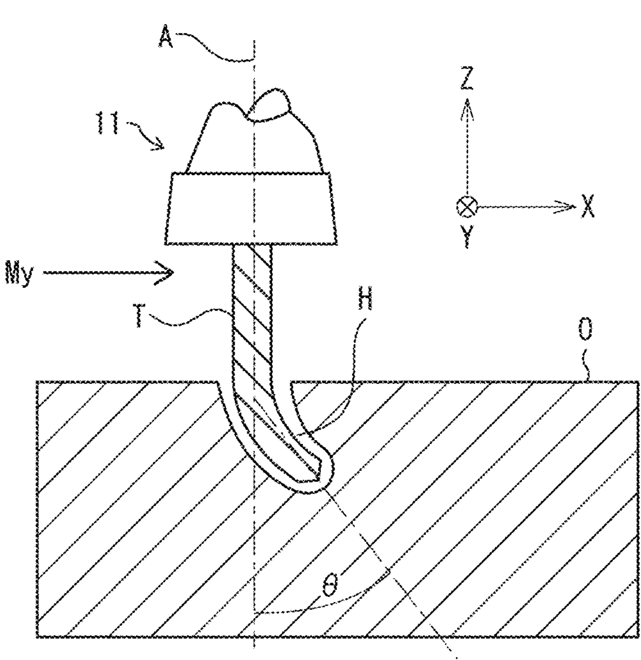
FIG. 4 is an enlarged view illustrating a part of the drilling device which is cutting and processing an object.

FIG. 4 is an enlarged view illustrating a part of the drilling device 10 which is cutting and processing the object O. During the cutting of the object O, the drill T is bent by the moment My. The tip of the bent drill T is at an angle θ with respect to the axis A (original axis of the drill T) of the spindle 12. When the angle θ becomes larger as the hole H is further drilled, a bending limit of the drill T is reached, resulting in damage to the drill T.

As such, the moments Mx and My are caused by the slight faults (such as a small displacement from the intersection of the drill T with the object O at the right angle and slight unevenness of the object O) at the start of the processing. As a result, the drill T is bent. If such a bend is not corrected, the bend may lead to a serious fault (for example, damage to the drill T). In such a case, the drilling device 10 of the present embodiment reduces the bend of the drill T and prevents the serious fault from being caused.

Thus, the control section 30 determines whether the moment Mx or My is equal to or greater than the predetermined threshold Th1 (Mx, My≥Th1) (step S3). If the result of the determination is YES, the control section 30 controls the parallel link mechanism 18 so that the parallel link mechanism 18 adjusts the direction of the spindle 12 (step S3). As a result, the moment Mx or My is reduced, and the bend of the drill T is reduced. This makes it possible to prevent damage to the drill T.

Further, such a control carried out from the start of the processing makes it easy to always keep the drill T straight. In this case, the bend of the hole H is reduced. That is, it becomes easier to keep the angle θ in FIG. 4 approximately 0, and it is possible to contribute to an improvement in processing accuracy.

The control section 30 determines whether the force Fz and the moment Mz are equal to or greater than the predetermined thresholds Th2 and Th3, respectively (Fz≥Th2, Mz≥Th3) (step S5). If the result of the determination is YES, the control section 30 controls the servo cylinder 22 so that the servo cylinder 22 adjusts the distance between the spindle 12 and the object O (specifically, a pressing amount of the spindle 12) (step S6). As a result, the force Fz and the moment Mz are reduced. This makes it possible to prevent damage to the drill T.

The force Fz and the moment Mz are caused by, for example, contact of chips with the drill T. When the drill T contacts the chips jammed in the hole H and receives the large force Fz and the large moment Mz, the drill T may become damaged. In particular, when the hole H needs to be deep, the force Fz and the moment Mz are likely to present a problem. When the hole H is further drilled to be deep, the chips generated during the cutting are likely to be jammed in the hole H.

In the above description, a case where the control based on the moments Mx and My and the control based on the force Fz and the moment Mz are carried out in this order is taken as an example for ease of understanding. The order may be reversed. Alternatively, the controls may be carried out simultaneously.

As described above, in the present embodiment, making the moments Mx and My applied to the spindle 12 less than the threshold Th1 reduces the bend of the drill T and, in turn, makes it possible to prevent the drill T from being damaged. Furthermore, reducing the bend of the drill T from the start of the processing achieves an improvement in straightness (processing accuracy) of the hole H to be formed.

Further, in the present embodiment, making the force Fz and the moment Mz applied to the spindle 12 less than the thresholds Th2 and Th3, respectively, makes it possible to prevent damage to the drill T resulting from the jammed chips.

(Variation)

Figure 5:
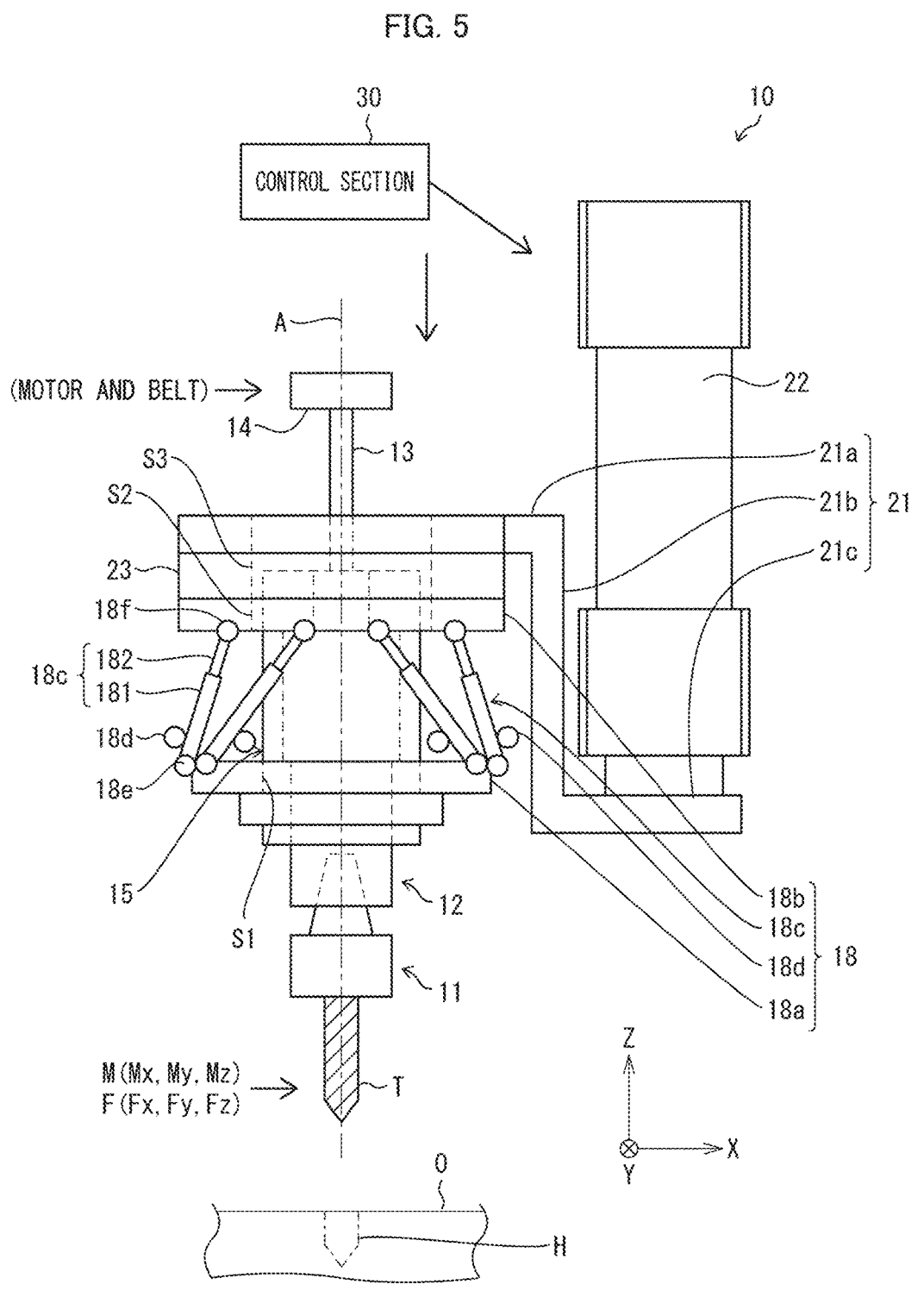

The following will describe the drilling device 10 in accordance with a variation. FIG. 5 is a view illustrating the drilling device 10 in accordance with the variation of the present invention. In the drilling device 10 in accordance with the variation, an attachment stay 21 is bent and is divided into members 21*a*, 21*b*, and 21*c*. The member 21*b* is vertically disposed between a spindle holding section 15 and a servo cylinder 22. This decreases the distance between the spindle holding section 15 and the servo cylinder 22 and thus makes the drilling device 10 compact.

In the embodiment, in a case where the moment Mz and the force Fz are equal to or greater than the thresholds Th2 and Th3, respectively, the control section 30 controls the servo cylinder 22. Instead, the operation of the servo cylinder 22 may be stopped to prevent the spindle 12 (drill T) from being further pressed. Alternatively, sound or light may be generated with use of a sound output device or a display device to issue a warning to the operator of the drilling device 10.

In the embodiment, the link 18*c* has an adjustable length. Alternatively, the link 18*c* may be bendable. In this case, adjustment of the angle at which the link 18*c* is bent can adjust the orientation of a stage 18*a* with respect to a stage 18*b*.

In the embodiment, the force sensor 23 is disposed between the attachment stay 21 and the parallel link mechanism 18. Alternatively, the force sensor 23 may be disposed at other place. The force sensor 23 can be disposed at any place on a path from the drill T to the attachment stay 21 via the spindle 12, the spindle holding section 15, and the parallel link mechanism 18. For example, the force sensor 23 can be disposed between the spindle holding section 15 and the parallel link mechanism 18.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10 Drilling device
12 Spindle
15 Spindle holding section
18 Parallel link mechanism
23 Force sensor
30 Control section.

The invention claimed is:

1. A drilling device comprising:

a spindle for rotating a drill so that the drill processes an object;

a parallel link mechanism configured to adjust a direction of the spindle;

a force sensor configured to detect a moment which is applied to the spindle and is about an axis perpendicular to an axial direction of the spindle;

a control section configured to control the parallel link mechanism on a basis of the moment detected by the force sensor so that the parallel link mechanism adjusts the direction of the spindle;

a holding section for holding the spindle such that the spindle is rotatable, the parallel link mechanism comprising:

a first stage fixed to the holding section;

a second stage opposite to the first stage;

a plurality of links connecting the first stage and the second stage in such a manner as to each have a degree of freedom; and a driving part configured to drive the plurality of links.

2. The drilling device according to claim 1, wherein, in a case where the moment is equal to or greater than a predetermined threshold, the control section controls the parallel link mechanism so that the moment is reduced.

3. The drilling device according to claim 1, wherein:

the first stage has a first insertion portion through which the spindle is inserted;

the second stage has a second insertion portion through which the spindle is inserted; and the plurality of links are disposed around the spindle.

4. The drilling device according to claim 1, wherein the force sensor has an insertion portion through which the spindle is inserted.

5. The drilling device according to claim 1 comprising a distance adjustment mechanism configured to adjust a distance between the spindle and the object, the force sensor detecting a moment about an axis of the spindle, the control section controlling the distance adjustment mechanism on a basis of the moment about the axis of the spindle so that the distance adjustment mechanism adjusts a distance between the spindle and the object.

6. The drilling device according to claim 5, wherein, in a case where the moment about the axis of the spindle is equal to or greater than a predetermined threshold, the control section controls the distance adjustment mechanism so that the moment about the axis of the spindle is reduced.

7. A drilling device comprising:

a spindle for rotating a drill so that the drill processes an object;

a parallel link mechanism configured to adjust a direction of the spindle;

a force sensor configured to detect a moment which is applied to the spindle and is about an axis perpendicular to an axial direction of the spindle;

a control section configured to control the parallel link mechanism on a basis of the moment detected by the force sensor so that the parallel link mechanism adjusts the direction of the spindle; and a distance adjustment mechanism configured to adjust a distance between the spindle and the object, the force sensor detecting a force in an axial direction of the spindle, the control section controlling the distance adjustment mechanism on a basis of the force so that the distance adjustment mechanism adjusts the distance between the spindle and the object.

8. The drilling device according to claim 7, wherein, in a case where the force is equal to or greater than a predetermined threshold, the control section controls the distance adjustment mechanism so that the force is reduced.

* * * * *